United States Patent
Kiselev et al.

(10) Patent No.: US 12,313,808 B2
(45) Date of Patent: May 27, 2025

(54) CORRELATING TRUE VERTICAL DEPTHS FOR A MEASURED DEPTH

(71) Applicant: Halliburton Energy Services, Inc., Houston, TX (US)

(72) Inventors: Vladimir Kiselev, Houston, TX (US); Robert Gillson, III, Perth (AU); Edgar Gutierrez Gonzalez, Houston, TX (US); Jeremy James Combs, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 556 days.

(21) Appl. No.: 17/578,685

(22) Filed: Jan. 19, 2022

(65) Prior Publication Data
US 2023/0228901 A1     Jul. 20, 2023

(51) Int. Cl.
*G01V 3/38* (2006.01)
*E21B 7/04* (2006.01)
*E21B 44/00* (2006.01)
*E21B 47/002* (2012.01)
*E21B 47/12* (2012.01)
*E21B 49/00* (2006.01)
(Continued)

(52) U.S. Cl.
CPC .................. *G01V 3/38* (2013.01); *E21B 7/04* (2013.01); *E21B 44/00* (2013.01); *E21B 47/0025* (2020.05); *E21B 47/12* (2013.01); *E21B 49/00* (2013.01); *G01V 3/20* (2013.01); *G01V 3/34* (2013.01); *G06F 18/00* (2023.01); *E21B 2200/22* (2020.05)

(58) Field of Classification Search
None
See application file for complete search history.

(56) References Cited

U.S. PATENT DOCUMENTS

| | | | |
|---|---|---|---|
| 5,299,128 A | 3/1994 | Antoine et al. | |
| 5,446,654 A | 8/1995 | Chemali et al. | |
| (Continued) | | | |

FOREIGN PATENT DOCUMENTS

| | | |
|---|---|---|
| EP | 0886794 B1 | 5/2004 |
| WO | 2019177574 A1 | 9/2019 |
| WO | 2023028207 A1 | 3/2023 |

*Primary Examiner* — Lina Cordero
(74) *Attorney, Agent, or Firm* — Benjamin Ford; Parker Justiss, P.C.

(57) ABSTRACT

The disclosure presents processes that utilize collected resistivity data, for example, from an ultra-deep resistivity tool located downhole a borehole. In some aspects, each slice of resistivity data can generate multiple distribution curves that can be overlaid offset resistivity logs. In some aspects, an analysis can be performed to identify trends in the distribution curves that can be used to identify approximate locations of subterranean formation surfaces, shoulder beds, obstacles, proximate boreholes, and other borehole and geological characteristics. As the number of distribution curves generated increase, the confidence in the analysis also increases. In some aspects, the number of distribution curves can be twenty, one hundred, one hundred and one, or other counts of distribution curves. In some aspects, the resistivity data can be used to generate two or more synchronized view perspectives of a specific location along the borehole, where each view perspective uses the same focus area.

22 Claims, 12 Drawing Sheets

(51) Int. Cl.
 *G01V 3/20* (2006.01)
 *G01V 3/34* (2006.01)
 *G06F 18/00* (2023.01)

(56) References Cited

U.S. PATENT DOCUMENTS

| | | | |
|---|---|---|---|
| 5,867,806 A * | 2/1999 | Strickland | G01V 3/38 |
| | | | 702/7 |
| 2002/0040274 A1 * | 4/2002 | Yin | G01V 3/38 |
| | | | 702/7 |
| 2012/0188236 A1 | 7/2012 | Legendre et al. | |
| 2012/0191354 A1 * | 7/2012 | Caycedo | E21B 47/022 |
| | | | 702/9 |
| 2015/0035536 A1 | 2/2015 | Tang | |
| 2015/0088426 A1 | 3/2015 | Tang | |
| 2016/0252648 A1 | 9/2016 | Omeragic et al. | |
| 2017/0146692 A1 | 5/2017 | Yu et al. | |
| 2017/0243383 A1 | 8/2017 | Gillan et al. | |
| 2017/0342815 A1 | 11/2017 | Hay | |
| 2018/0179879 A1 | 6/2018 | Ma et al. | |
| 2018/0252101 A1 | 9/2018 | Bartetzko et al. | |
| 2020/0033501 A1 | 1/2020 | Nyrnes et al. | |
| 2021/0192712 A1 | 6/2021 | Maeso et al. | |
| 2021/0208302 A1 | 7/2021 | Ma et al. | |
| 2022/0010675 A1 | 1/2022 | Yin et al. | |
| 2022/0018238 A1 | 1/2022 | Alqurashi | |

* cited by examiner

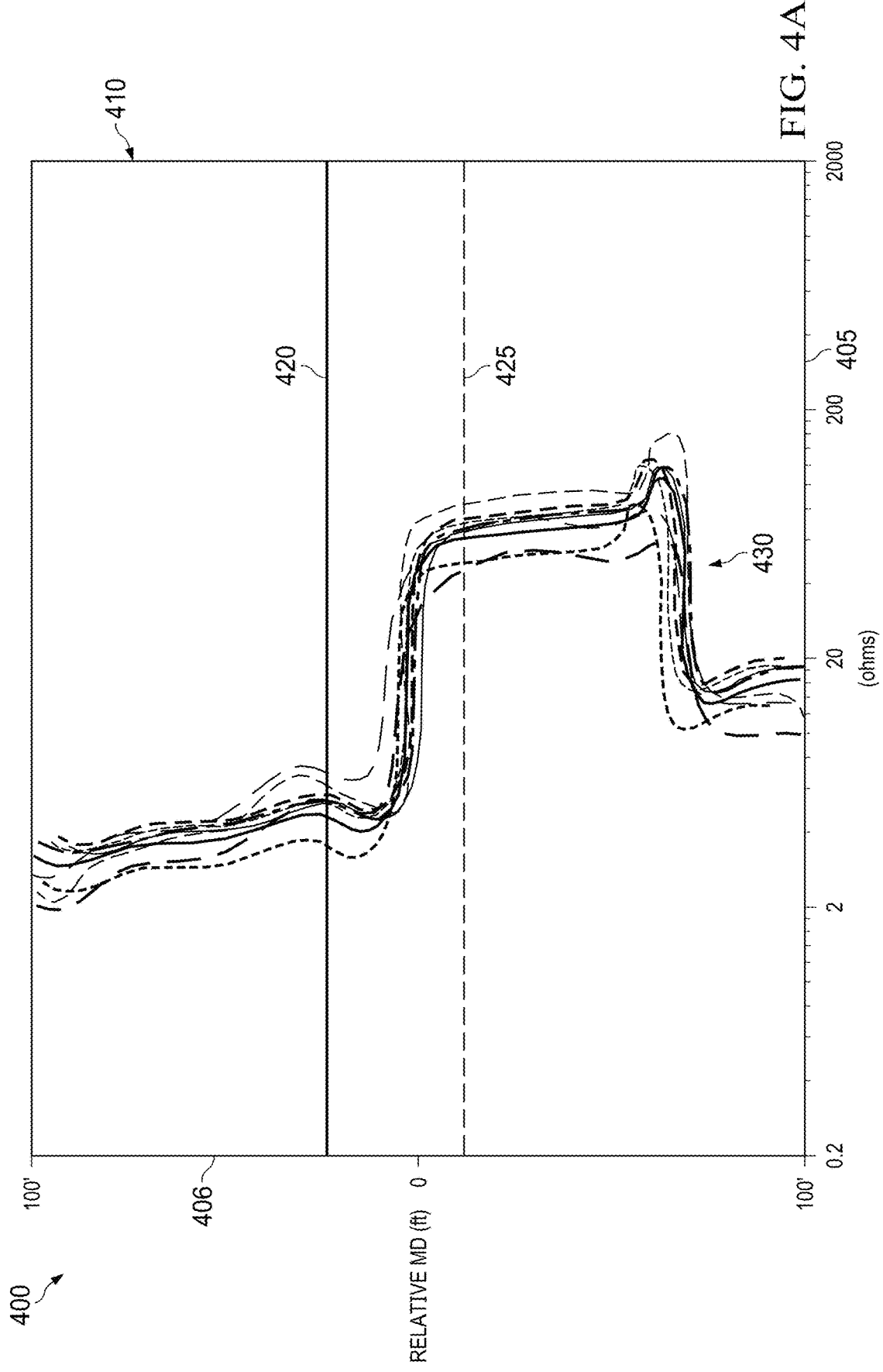

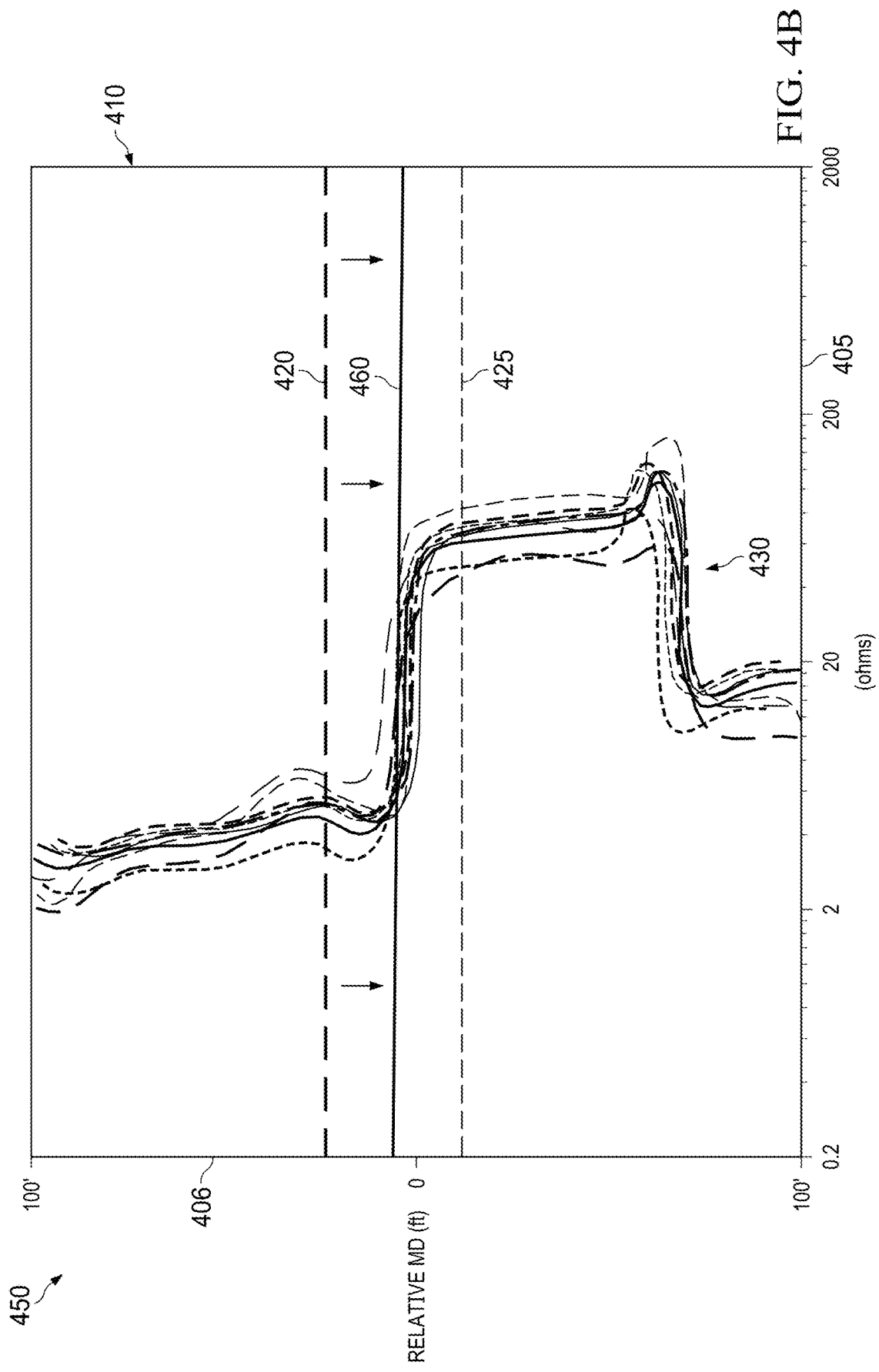

CORRELATING TRUE VERTICAL DEPTHS FOR A MEASURED DEPTH

TECHNICAL FIELD

This application is directed, in general, to providing geo-steering inputs and, more specifically, to localizing subterranean formations and obstacles.

BACKGROUND

When developing a borehole, such as performing drilling operations, data can be collected downhole. The data can be resistivity data. Conventionally, one to four distribution curves of the resistivity data can be generated. The limited analysis available can be utilized for quality control checks for other types of analysis, but cannot be used reliably as a primary analysis of the downhole location of the borehole. Other data and non-resistivity data would need to be used to determine subterranean formation geology or object localization. It would be beneficial to be able to improve the utilization of collected resistivity data to provide downhole analysis with higher confidence than can be done today.

SUMMARY

In one aspect, a method is disclosed. In one embodiment, the method includes (1) receiving input parameters and resistivity data for a borehole, (2) generating a set of distribution curves utilizing the resistivity data and the input parameters, (3) correlating the set of distribution curves with one or more offset resistivity logs to determine correlated distribution curves, (4) identifying one or more shoulder beds through an analyzation of the correlated distribution curves, and (5) adjusting one or more distribution curves in the set of distribution curves to align TVDs of each of the one or more distribution curves to generate adjusted distribution curves, and identifying one or more adjusted shoulder beds utilizing the adjusted distribution curves and the one or more shoulder beds.

In a second aspect, a system is disclosed. In one embodiment, the system includes (1) a data transceiver, capable of receiving input parameters and resistivity data for a location downhole a borehole, and (2) a localization analyzer, capable of communicating with the data transceiver, generating distribution curves utilizing the resistivity data, overlaying the distribution curves with offset logs, identifying shoulder beds from the overlaying of the distribution curves, and aligning TVDs of selected distribution curves to adjust the overlaid distribution curves, wherein there are more than four distribution curves.

In a third aspect, a computer program product having a series of operating instructions stored on a non-transitory computer-readable medium that directs a data processing apparatus when executed thereby to perform operations to analyze distribution curves of resistivity data collected downhole a borehole is disclosed. In one embodiment, the operations include (1) receiving input parameters and resistivity data for the borehole, (2) generating a set of distribution curves utilizing the resistivity data and the input parameters, (3) correlating the set of distribution curves with one or more offset resistivity logs to determine correlated distribution curves, (4) identifying one or more shoulder beds through an analyzation of the correlated distribution curves, and (5) adjusting one or more distribution curves in the set of distribution curves to align TVDs of each of the one or more distribution curves to generate adjusted distribution curves, and identifying one or more adjusted shoulder beds utilizing the adjusted distribution curves and the one or more shoulder beds.

BRIEF DESCRIPTION

Reference is now made to the following descriptions taken in conjunction with the accompanying drawings, in which:

FIG. 4A is an illustration of a diagram of example distribution curves on a logarithmic scale;

FIG. 4B is an illustration of a diagram of an example surface adjustment of a subterranean formation;

DETAILED DESCRIPTION

Figure 1:
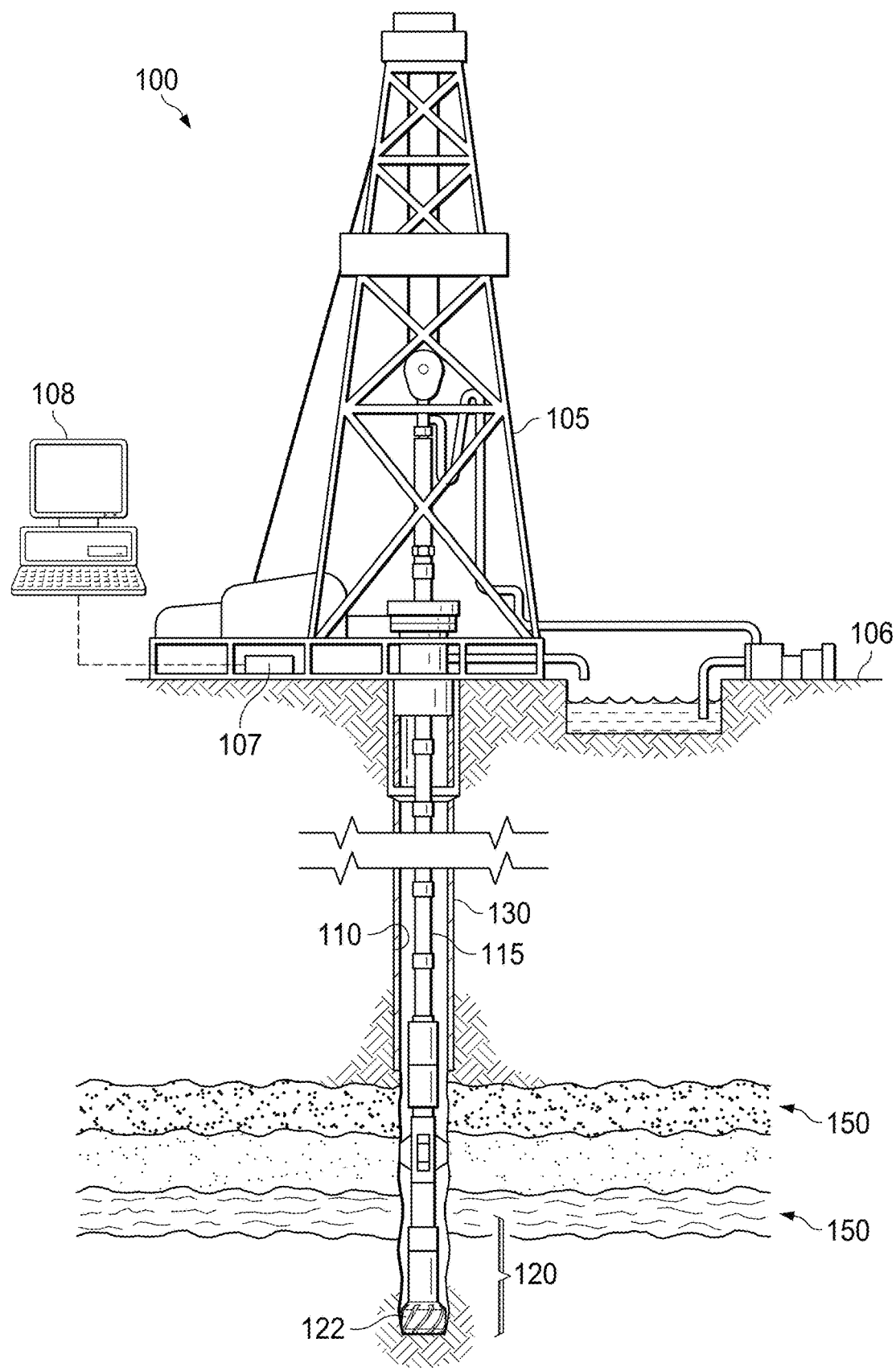
FIG. 1 is an illustration of a diagram of an example drilling system.

Developing a borehole, such as for scientific or hydrocarbon production purposes, can utilize data collected during operations, such as drilling operations or wireline operations. Other operations can be measuring while drilling (MWD), logging while drilling (LWD), seismic while drilling (SWD), and other borehole operation types. Various types of sensors can be utilized to collect the data, such as magnetic resonance, resistivity, acoustic, nuclear, temperature, pressure, and other sensor types. The data can be utilized by various borehole systems. For example, a geo-steering system for a drilling bit can utilize the data to determine future steering directions to the drill bit.

In analyzing the collected data, geological horizontal correlations can be done with a true vertical depth (TVD) for a specific measured depth (MD). The assumption made for the analysis can be that the subterranean formations are in a layer cake type geology, which is rarely the situation. Users often want to steer a drilling bit in one orientation, e.g., horizon, while mapping another orientation for development, such as another borehole.

In some aspects, this disclosure presents processes to correlate multiple TVDs for a specified MD, while allowing for multiple orientation, e.g., horizon, correlations. The correlation can be made utilizing a distribution curve produced from the downhole sensors. The distribution curve can show shoulder beds above and below the target surface.

The shoulder beds shown in the distribution curves can be correlated to the surfaces in the offset data. This can allow a geo-steering system, or other borehole system, to correlate the target horizon, and multiple orientations above and below the target orientation. The advantage can be to allow for more accurate control points and a better understanding of the subterranean formations.

The collected data can be collected by a resistivity sensor, such as an ultra-deep resistivity tool, that can be enabled for the collection of more data. The data collected can represent more than four distribution curves, for example, 101 or 102 distribution curves.

When the distribution curves are layered on top of an offset resistivity, e.g., offset logs, the resultant combination can be utilized to improve correlations made. In some aspects, the distribution curve layering on top of offset resistivity can be rendered on a user system allowing a user interaction and review. In some aspects, the distribution curve layering on top of offset resistivity can be performed by a computing system, such as a machine learning system, with or without a user display system.

Conventionally, the correlation can utilize real-time collected data compared to modeled pseudo-log data. The issue can be that real-time data is being compared to calculated distributions. This disclosure demonstrates improved accuracy of the distribution curves fitting offset resistivity by utilizing inversion algorithms. These processes can utilize the distribution curves correlated to the offset resistivity enabling an improved accuracy of the model of the subterranean formation. In some aspects, the analysis of the distribution curves can be conducted faster, allowing an event or object to be identified quicker than using conventional analysis processes. This can allow a mitigation strategy to be implemented earlier in the borehole operation plan thereby lowering costs of developing the borehole.

While utilizing a geo-steering system, it can be difficult to understand how the current model represents the subterranean formation a distance below the surface. In some aspects, a three dimensional (3D) volumetric rendered visualization of more than one view perspective of the borehole at the downhole location can be simultaneously displayed, where each view perspective utilizes the same focus area as the target point for the respective view perspective. This can enable the determination of directions to a geo-steering system using the view perspectives of the subterranean formation or borehole at the downhole location. The 3D visualization can be generated from the data collected at the downhole location by downhole sensors, such as an ultra-deep resistivity sensor. More than two view perspectives can be shown, such as three, four, or more perspectives. The ability to see multiple different perspectives of a volume at a downhole location of a borehole can improve the understanding of the model. In some aspects, the visualization can be done in real-time or near real-time. In some aspects, the 3D visualization can be represented by a set of data, without a display component, and the analysis can be processed by a computing system, such as by a geo-steering system or a well site controller.

In some aspects, the 3D visualization can include, for example, a top view, a right view, a cross-sectional view, an oblique view, or a axial borehole view, allowing the geo-steering system or a user to analyze all views of the model concurrently. The multiple point of views are concurrently focused on the same focus area, e.g., location or focal point, within the borehole, where the multiple point of views are rendered in real-time or near real-time, can improve the accuracy of analyzing the subterranean formation and allow for improved directions to a geo-steering system.

In some aspects, the focal point for the 3D visualization can be moved through space on the X, Y and Z planes, where the focal point is a location downhole of a borehole and the focal point is used as the center or origin for each view perspective. Each view perspective, e.g., each two-dimensional (2D) set of data, can be updated using each respective orientation parameters as the focal point is moved. As the focal point advances along the borehole path, the selected views can move in a synchronized manner portraying the different view perspectives of the same volume of the borehole and subterranean formation. The visualized perspectives can be selected by a user, such as for display on a user system, or by a computing system, such as when the analysis is conducted by a machine learning system. In some of the machine learning system aspects, the visualized perspectives can be represented by data where no visual display is rendered and the analysis is applied to the data. These aspects can allow for complex geological scenarios to be analyzed, enabling an improved time to make geo-steering decisions, thereby saving time, money, and resources.

Turning now to the figures, FIG. 1 is an illustration of a diagram of an example drilling system 100, for example, a logging while drilling (LWD) system, a measuring while drilling (MWD) system, a seismic while drilling (SWD) system, a telemetry while drilling (TWD) system, injection well system, extraction well system, and other borehole systems. Drilling system 100 includes a derrick 105, a well site controller 107, and a computing system 108. Well site controller 107 includes a processor and a memory and is configured to direct operation of drilling system 100. Derrick 105 is located at a surface 106.

Extending below derrick 105 is a borehole 110 with downhole tools 120 at the end of a drill string 115. Downhole tools 120 can include various downhole tools, such as a formation tester or a bottom hole assembly (BHA). Downhole tools 120 can include a resistivity tool or an ultra-deep resistivity tool. At the bottom of downhole tools 120 is a drilling bit 122. Other components of downhole tools 120 can be present, such as a local power supply (e.g., generators, batteries, or capacitors), telemetry systems, sensors, transceivers, and control systems. Borehole 110 is surrounded by subterranean formation 150.

Well site controller 107 or computing system 108 which can be communicatively coupled to well site controller 107, can be utilized to communicate with downhole tools 120, such as sending and receiving acoustic data, telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107. Well site controller 107 or computing system 108 can communicate with downhole tools 120 using conventional means, now known or later developed, to direct operations of downhole tools 120.

Casing 130 can act as barrier between subterranean formation 150 and the fluids and material internal to borehole 110, as well as drill string 115. The resistivity tool or ultra-deep resistivity tool, i.e., resistivity tools, can collect resistivity data relating to the subterranean formation where the resistivity tools are currently positioned. In some aspects, a localization analyzer can utilize the resistivity data to generate one or more view perspectives of the borehole and surrounding subterranean formations. The view perspectives can be displayed for a user using the same focal point for each view perspective. As a current view perspective is adjusted, the other view perspectives can be similarly adjusted. In some aspects, the localization analyzer can communicate the collected data or the results to another system, such as computer system 108 or well site controller 107 where the resistivity data can be filtered and analyzed. In some aspects, computing system 108 can be the localization analyzer and can receive the resistivity data from one or more of the resistivity tools. In some aspects, well site controller 107 can be the localization analyzer and can receive the resistivity data from one or more of the resistivity tools. In some aspects, the localization analyzer can be partially included with well site controller 107 and partially located with computing system 108.

Figure 2:
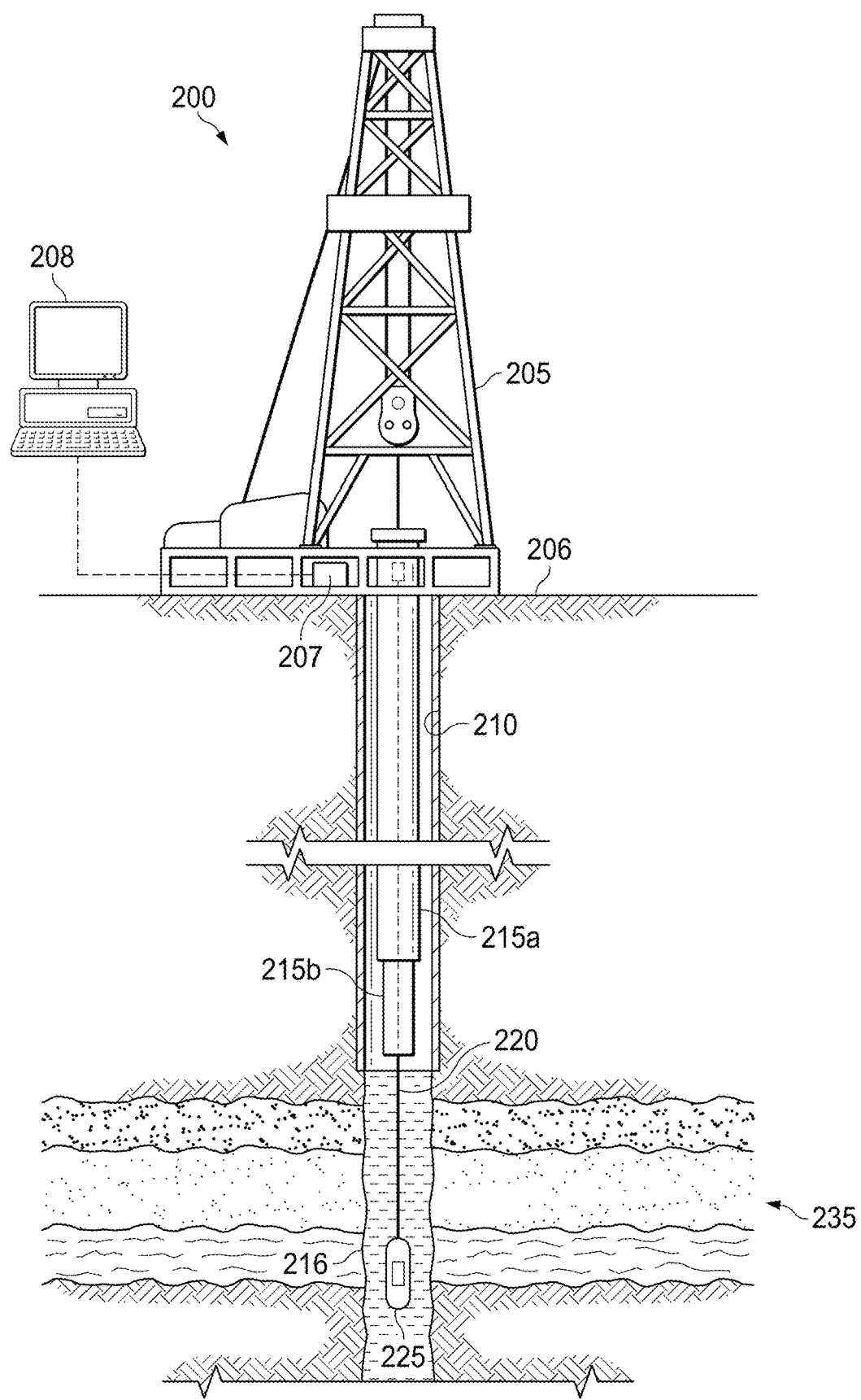
FIG. 2 is an illustration of a diagram of an example wireline system.

FIG. 2 is an illustration of a diagram of an example wireline system 200. Wireline system 200 depicts a wireline well system and includes a derrick 205, a well site controller 207, and a computing system 208. Well site controller 207 includes a processor and a memory and is operable to direct operation of wireline system 200. Derrick 205 is located at a surface 206. Computing system 208 can be proximate well site controller 207 or be a distance away, such as in a cloud environment, a data center, a lab, or a corporate office. Computing system 208 can be a laptop, smartphone, PDA, server, desktop computer, cloud computing system, and other computing systems.

Extending below derrick 205 is a borehole 210, with a cased section 215a, a cased section 215b, and one uncased section 216. Wireline 220 is inserted in borehole 210 to hold a downhole tool 225. Borehole 210 is surrounded by a subterranean formation 235 which includes a hydrocarbon reservoir. Cased section 215a and cased section 215b can be designed to withstand subterranean formation 235 as well as the operations of downhole tool 225.

Downhole tools 225 can include a resistivity tool or an ultra-deep resistivity tool, i.e., resistivity tools that can collect resistivity data and communicate the resistivity data to other tools or systems. In some aspects, downhole tools 225 can include a localization analyzer to analyze the collected resistivity data. The analyzed data can be communicated to one or more other systems, such as well site controller 207 or computing system 208. In some aspects, the resistivity data can be transmitted to another system, such as well site controller 207 or computing system 208. Well site controller 207 or computing system 208 can be a localization analyzer or a localization analyzer controller. In some aspects, the localization analyzer or a localization analyzer controller can be partially in well site controller 207, partially in computing system 208, partially in another computing system, or various combinations thereof. In some aspects, the results of the localization analyzer or localization analyzer controller can be used to generate one or more view perspectives of the borehole and subterranean formations at the location of the resistivity tools.

Figure 3:
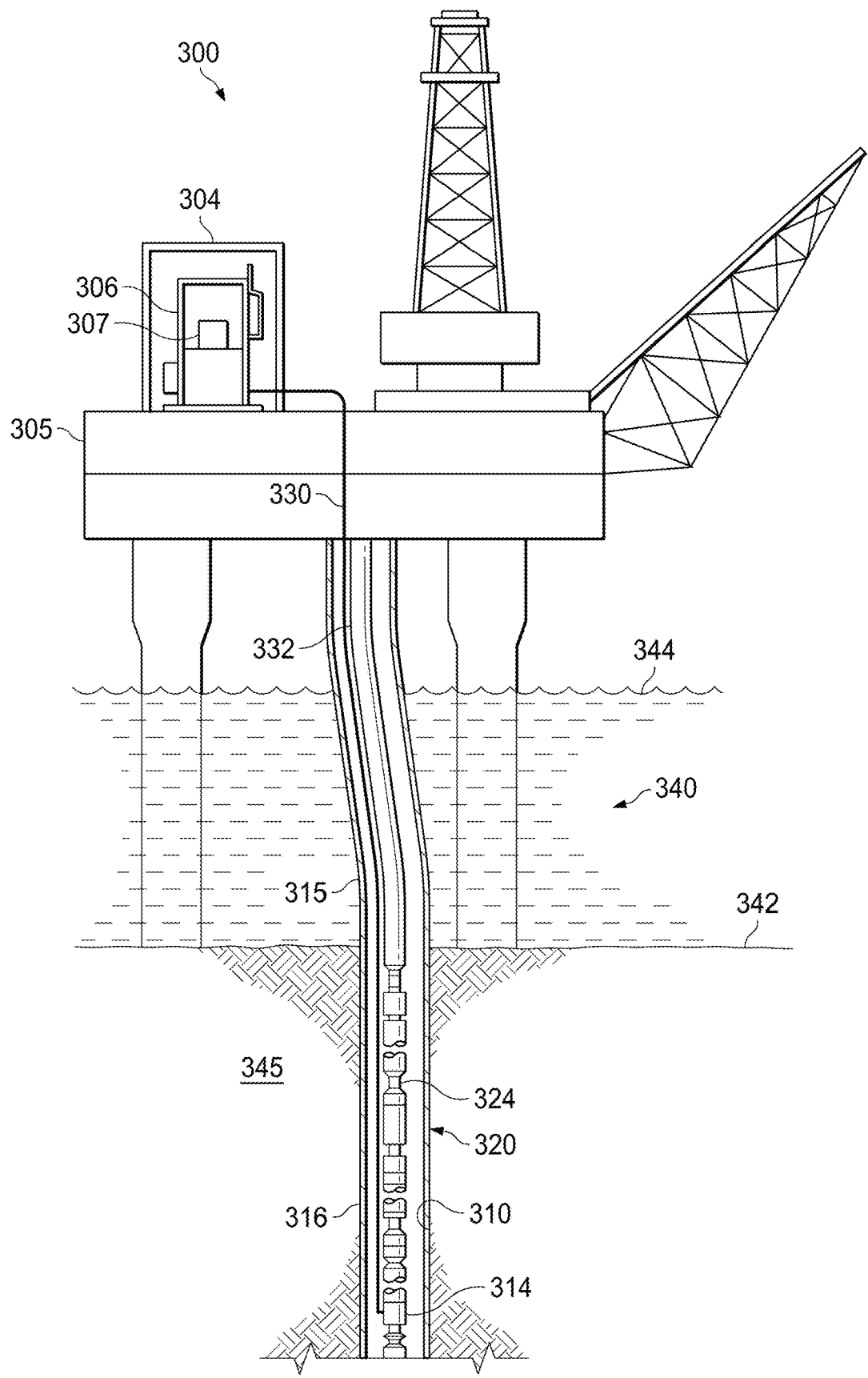
FIG. 3 is an illustration of a diagram of an example offshore system.

FIG. 3 is an illustration of a diagram of an example offshore system 300 with an electric submersible pump (ESP) assembly 320. ESP assembly 320 is placed downhole in a borehole 310 below a body of water 340, such as an ocean or sea. Borehole 310, protected by casing, screens, or other structures, is surrounded by subterranean formation 345. ESP assembly 320 can be used for onshore operations. ESP assembly 320 includes a well controller 307 (for example, to act as a speed and communications controller of ESP assembly 320), an ESP motor 314, and an ESP pump 324.

Well controller 307 is placed in a cabinet 306 inside a control room 304 on an offshore platform 305, such as an oil rig, above water surface 344. Well controller 307 is configured to adjust the operations of ESP motor 314 to improve well productivity. In the illustrated aspect, ESP motor 314 is a two-pole, three-phase squirrel cage induction motor that operates to turn ESP pump 324. ESP motor 314 is located near the bottom of ESP assembly 320, just above downhole sensors within borehole 310. A power/communication cable 330 extends from well controller 307 to ESP motor 314. A fluid pipe 332 fluidly couples equipment located on offshore platform 305 and ESP pump 324.

In some aspects, ESP pump 324 can be a horizontal surface pump, a progressive cavity pump, a subsurface compressor system, or an electric submersible progressive cavity pump. A motor seal section and intake section may extend between ESP motor 314 and ESP pump 324. A riser 315 separates ESP assembly 320 from water 340 until sub-surface 342 is encountered, and a casing 316 can separate borehole 310 from subterranean formation 345 at and below sub-surface 342. Perforations in casing 316 can allow the fluid of interest from subterranean formation 345 to enter borehole 310.

ESP assembly 320 can include a localization system, such as a resistivity tool or an ultra-deep resistivity tool, i.e., resistivity tools. In some aspects, ESP assembly 320 can include a localization analyzer to analyze the collected resistivity data. The analyzed data, e.g., results, can be communicated to one or more other systems, such as well controller 307. In some aspects, the collected resistivity data can be transmitted to another system, such as well controller 307. Well controller 307 can be a localization analyzer or a localization analyzer controller. In some aspects, the localization analyzer or the localization analyzer controller can be partially in well controller 307, partially in another computing system, or various combinations thereof. The results of the localization analyzer or localization analyzer controller can be used to generate one or more perspectives of the borehole and the surrounding subterranean formation.

FIGS. 1 and 2 depict onshore operations. Those skilled in the art will understand that the disclosure is equally well suited for use in offshore operations, such as shown in FIG. 3. FIGS. 1-3 depict specific borehole configurations, those skilled in the art will understand that the disclosure is equally well suited for use in boreholes having other orientations including vertical boreholes, horizontal boreholes, slanted boreholes, multilateral boreholes, and other borehole types.

FIG. 4A is an illustration of a diagram of example distribution chart 400 on a logarithmic scale. In some aspects, more than four distribution curves can be plotted, such as twenty, one hundred, or other counts of distribution curves. By analyzing the shoulder beds represented by the distribution curves, confidence in the correlations can increase from the conventional processes. In conventional processes, four distribution curves were typically available to be plotted. This can be used for quality control checks and other uses, while not having enough confidence to be used as a primary analysis tool.

Using the conventional processes, geo-steering was typically done by comparing real-time or near real-time data to offset data to generate inputs to the geo-steering system. In some aspects, this disclosure can utilize an analysis of the inversion of the distribution curves to generate input for the geo-steering system. As the number of distribution curves increases, for example, to twenty or higher, the confidence in the analysis of the distribution curves also increases where the analysis can be used by geo-steering systems. In some aspects, the analysis of the distribution curves can be conducted by a machine learning system.

Distribution chart 400 has an x-axis 405 showing a logarithmic scale in ohms. Distribution curves 430 can be displayed using a standard logarithmic scale. Distribution curves 430 show the distribution of results of analyzing the resistivity data. The various models used can be iterated over the data to generate each of the distribution curves. For example, the distribution curves can utilize various algorithms, such as a peak value, a minimum value, a maximum value, an average value, and other algorithms. A y-axis 406 shows a relative MD in feet. A plot area 410 shows a sample of distribution curves 430 plotted. A surface 420 of a subterranean formation is shown in plot area 410. A borehole location 425 is shown in plot area 410. Surface 420 is above borehole location 425.

Distribution curves 430 can map approximately where surface 420 should be adjusted to. In some aspects, a user or a localization analyzer system can utilize the information to adjust surface 420, and through directions to a geo-steering system, adjust borehole location 425. This can improve the accuracy of borehole location 425 relative to surface 420.

FIG. 4B is an illustration of a diagram of an example surface adjustment 450. Surface adjustment 450, building on FIG. 4A, shows how a surface of a subterranean formation can be adjusted using an analysis of the distribution curves. Surface adjustment 450 shows an adjusted surface location 460 in an improved alignment with distribution curves 430. With the improved confidence in the distribution curve analysis due to the increase in number of distribution curves, the location of the surface of a subterranean formation can be adjusted to fit the distribution curves.

Figure 5A:
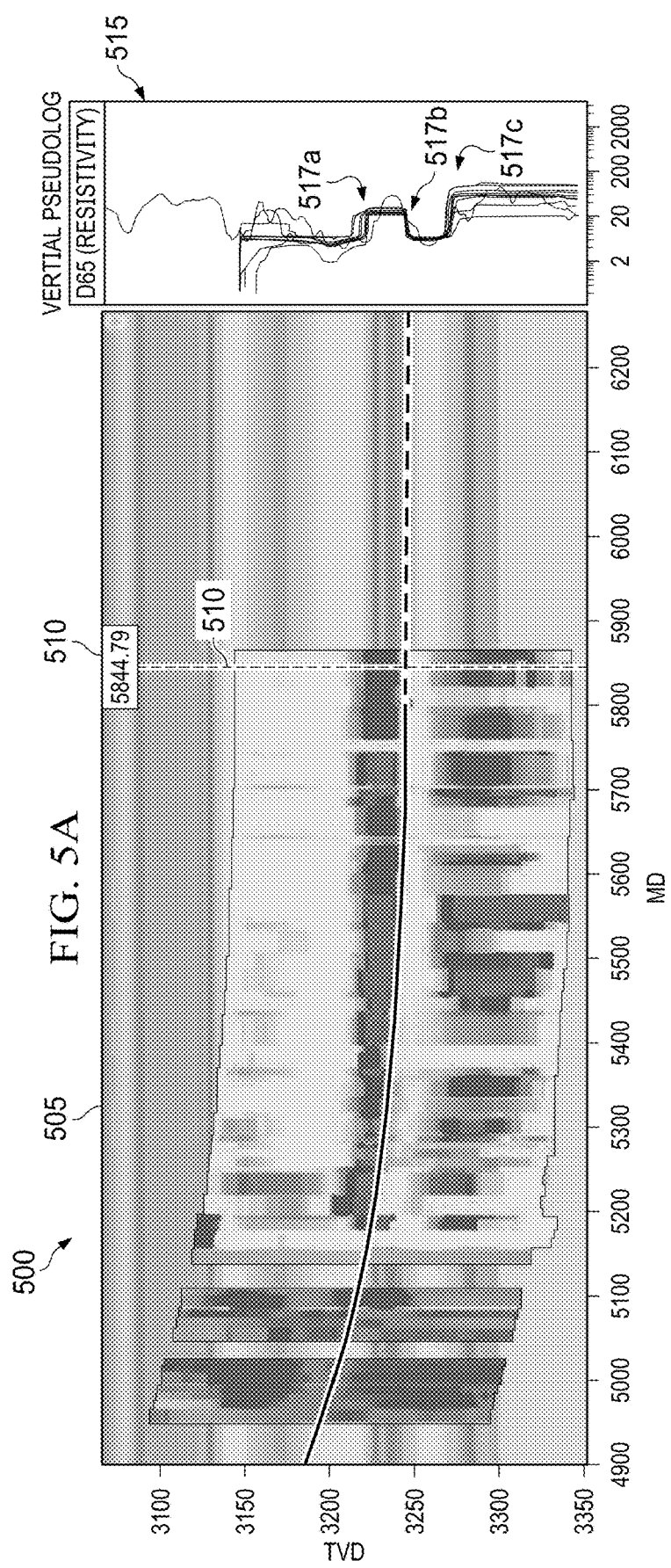
FIG. 5A is an illustration of a diagram of an example distribution curve display.

FIG. 5A is an illustration of a diagram of an example distribution curve display 500, which can show distribution curves being utilized to correlate the subterranean formations with one or more TVD points. Distribution curve display 500 has a display area 505 showing various elements of the resistivity data. For example, a slice 510 is a set of resistivity data at a specific MD. The specific MD is known. As each slice of data is analyzed, such as slice 510, it can be plotted on the cross section of the appropriate MD and plotted relative to the borehole path.

The inversion process applied to slice 510 and other slices of resistivity data, e.g., applying filtering and analysis algorithms to the resistivity data, can produce greater than 101 distribution curves, which is better than the conventional four distribution curves. These distribution curves, when plotted, for example, in vertical log trace 515, can produce a better representation of the subterranean formation when compared to an offset log representation. The multiple distribution curves can be plotted on the vertical log along with the offset resistivity. Vertical log trace 515 demonstrates a correlation position 517*a*, a correlation position 517*b*, and a correlation position 517*c* (collectively, correlation positions 517). Correlation positions 517 show locations of interest on the distribution curves that can be used for further analysis.

Figure 5B:
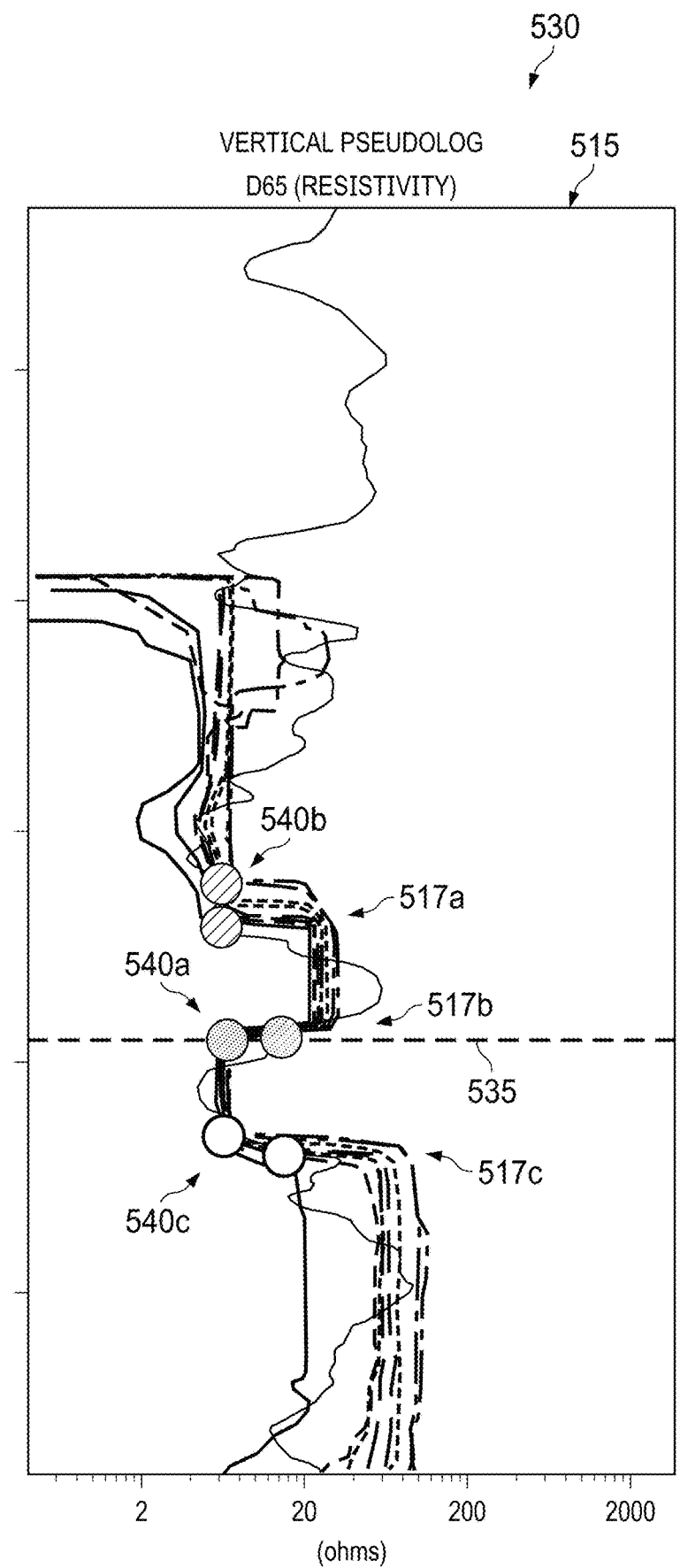
FIG. 5B is an illustration of a diagram of an example distribution curve correlation.

FIG. 5B is an illustration of a diagram of an example distribution curve correlation 530. Subterranean formation, e.g., geological, correlation can be achieved using a distinct shoulder bed. Distribution curve correlation 530 demonstrates three shoulder beds, e.g., correlation positions 517. These shoulder beds can be distinct with a higher confidence, e.g., stacking of the distribution curves. Correlation position 517*b* is closest to a borehole path 535 (shown as a dashed line).

A user or an automated analysis system, such as a machine learning system, can identify correlation pairs. Distribution curve correlation 530 demonstrates a correlation pair 540*a* (gray speckled circles), a correlation pair 540*b* (shown as circles with lines), and a correlation pair 540*c* (shown as white circles) (collectively, correlation pairs 540). Correlation pair 540*a* is located close to the same TVD. Correlation pair 540*b* and correlation pair 540*c* need slight adjustments in TVD to match the distribution curves to the offset data.

The process can adjust the TVD at the MD for the selected correlation pairs to improve the distribution curve proportions. An analysis of the resulting adjusted distribution curves can result in an identification (ID) of one or more surface IDs of the subterranean formations. In some aspects, the surface IDs can be used as input to a geo-steering system to improve decision making for determining directions to the geo-steering system.

Figure 6:
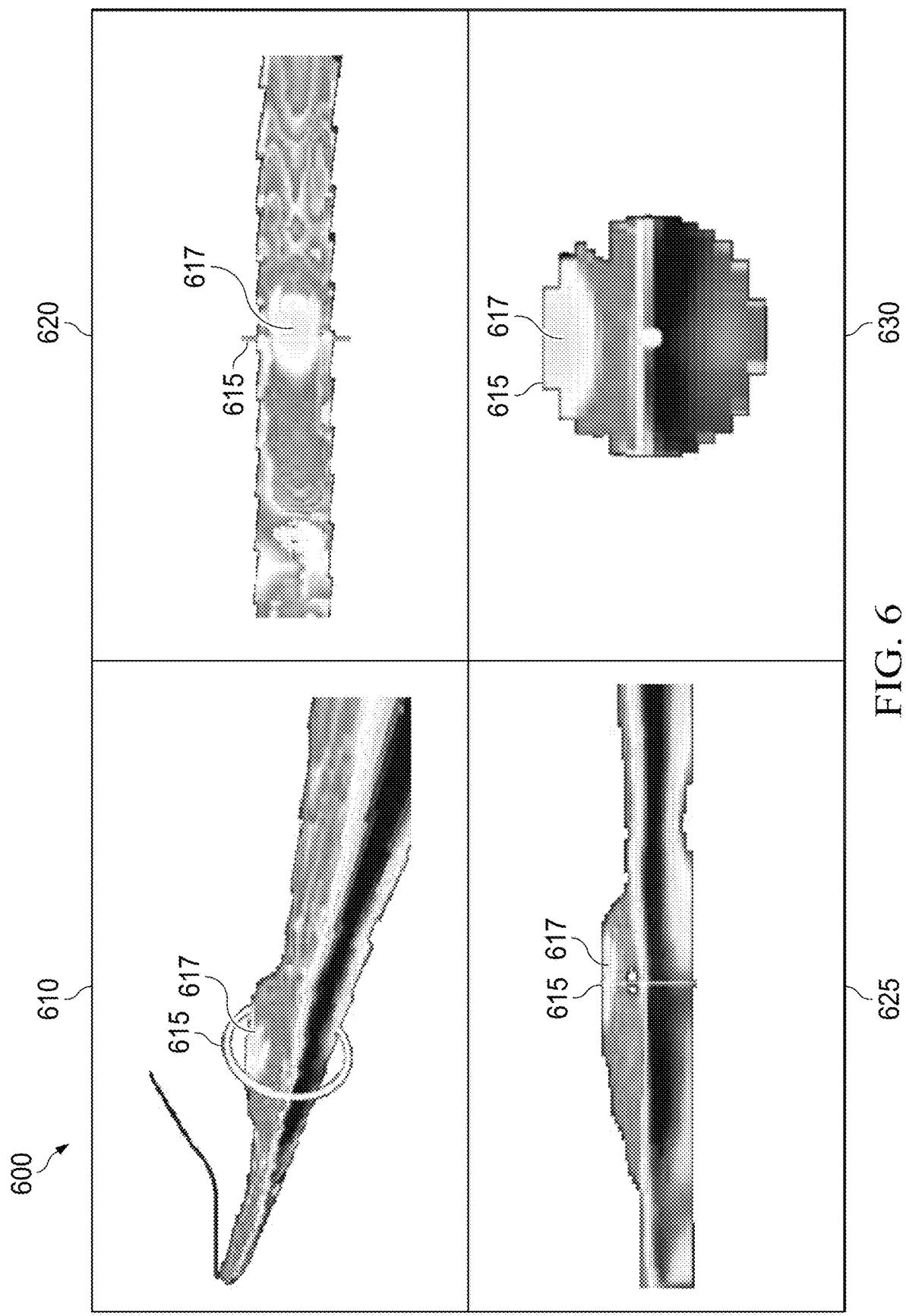
FIG. 6 is an illustration of a diagram of an example target view.

FIG. 6 is an illustration of a diagram of an example target view 600. Target view 600 can be of a borehole, a portion of a borehole, or can focus on an obstacle or adjacent borehole, for example, when drilling an intercept borehole or relief borehole. Target view 600 can use the collected resistivity data to generate two or more views where each view can be focused, e.g., centered, on the same focus area. Each view can show a differing view perspective.

As a user or system adjusts one of the view perspectives, the other view perspectives can be similarly adjusted to maintain the relative view perspectives on the same focus area. In some aspects, changes can be made to a current view perspective and then applied to the other view perspectives after an indication that the adjustment has been completed, for example, a user can select an 'apply' function. In some aspects, the adjustments to the other view perspectives can occur in real-time or near real-time as the current view perspective is being adjusted. Adjustments can utilize the same focus area or determine a new focus area, and be one or more of a movement in one or more of the X, Y, and Z axis, a slide in one or more direction, a rotation, a tilt, a zoom in or out, a trim of the view to improve focus on a particular location, a filter to enhance or remove specific resistivity data, or other adjustment functions.

Target view 600 includes an oblique view 610 of the borehole. Oblique view 610 has a target area 615, i.e., focus area or focal point, for the view perspective. The other view perspectives use target area 615 as their own focal point for their respective perspectives. An area of interest 617 is shown. By reviewing all of the available view perspectives, improved decision making can be made regarding area of interest 617. Target view 600 demonstrates a four view perspective system. In some aspects, fewer or additional view perspectives can be used, for example, a bottom view, a different oblique view, or another view angle.

Top view 620 of the borehole shows the top view perspective of the borehole. Right side view 625 of the borehole shows the right view perspective of the borehole. Cross sectional view 630 of the borehole shows the cross sectional view perspective of the borehole. By syncing these four view perspectives, as adjustments are made to one and automatically applied to the other view perspectives, an improved analysis of the borehole and surrounding subterranean formation can be conducted.

FIG. 4A, FIG. 4B, FIG. 5A, FIG. 5B, and FIG. 6 demonstrate a visual display of the resistivity data and the resulting analysis of the resistivity data. In some aspects, the visual display can be utilized by a user to determine the next steps of the analysis. In some aspects, the visual display does not need to be generated, and a system, such as a machine learning system, can perform the analysis using the received data. In some aspects, a visual display and a machine learning system can be utilized. In some aspects, the analysis of the resistivity data can occur by a downhole tool, such as a resistivity tool. In some aspects, the resistivity data or partially analyzed resistivity data can be transmitted to one or more surface computing systems, such as a well site controller, a computing system, or other processing system. The surface system or surface systems can perform the analysis and can communicate the results to one or more other systems, such as a well site controller, a well site operation planner, a geo-steering system, or another borehole system.

Figure 7A:
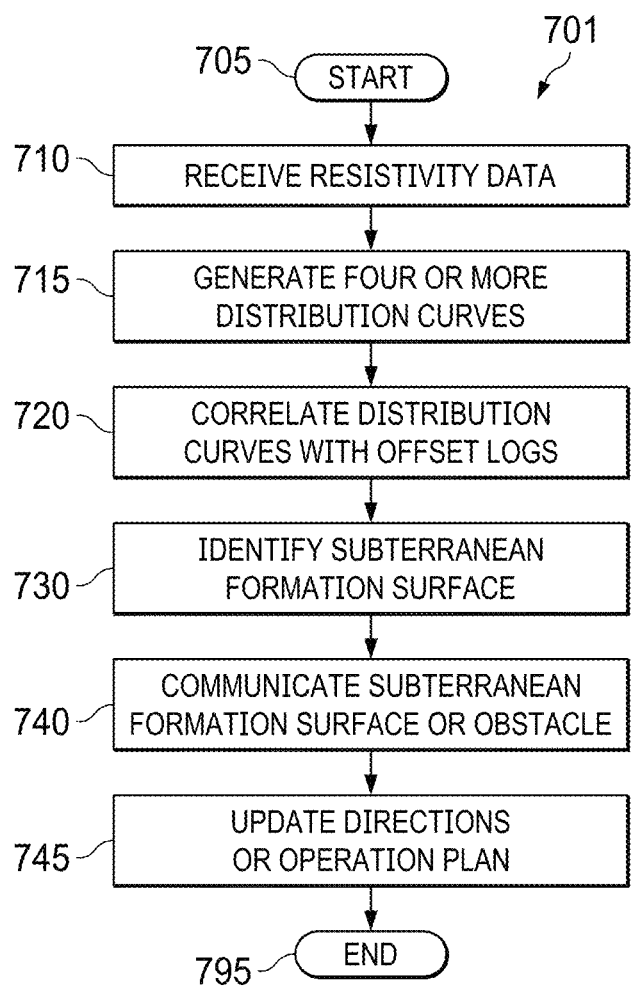
FIG. 7A is an illustration of a flow diagram of an example method to utilize multiple distribution curves.

FIG. 7A is an illustration of a flow diagram of an example method 701 to utilize multiple distribution curves. Method 701 can be performed on a computing system, for example, localization analyzer system 800 of FIG. 8 or localization analyzer controller 900 of FIG. 9. The computing system can be a well site controller, a geo-steering system, a resistivity system, a reservoir controller, a data center, a cloud environment, a server, a laptop, a mobile device, smartphone, PDA, or other computing system capable of receiving the resistivity data, input parameters, and capable of communicating with other computing systems. Method 701 can be encapsulated in software code or in hardware, for example, an application, code library, dynamic link library, module, function, RAM, ROM, and other software and hardware implementations. The software can be stored in a file, database, or other computing system storage mechanism. Method 701 can be partially implemented in software and partially in hardware. Method 701 can perform the steps for the described processes, for example, calculating distribution curves, overlaying offset logs, or identifying subterranean formation surfaces.

Method 701 starts at a step 705 and proceeds to a step 710. In step 710, resistivity data can be received. The resistivity data can be collected by one or more downhole sensors, such as a resistivity tool or an ultra-deep resistivity tool. In a step 715, the resistivity data can be utilized to generate four or more distribution curves. The number of distribution curves can vary, such as twenty, ninety, one hundred, one hundred and one, and other counts of distribution curves. The distribution curves can be generated from a slice of resistivity data.

In a step 720, the distribution curves can be laid over other data (overlaid distribution curves), for example, offset resistivity logs. In a step 730, subterranean formation surfaces can be identified. A subterranean formation surface is an area of change in the geological characteristics, such as between layers of the subterranean formation. These surfaces can be identified by a consistent change in the distribution curves. For example, if the distribution curves are plotted and are generally in a vertical orientation, when the distribution curves change to a generally horizontal orientation, a surface is likely to be present at that location. As the number of distribution curves increase, the confidence in the identifications of the surfaces also increases. If distribution curves do not form a consistent pattern that can be extrapolated, then other analysis can be conducted, for example, determining a different geological formation, determining an error in the data collected, or determining an anomaly located at that MD position.

In a step 740, the identified subterranean formation surface information, and other results (e.g., obstacles, proximate boreholes, other borehole or geological characteristics) and analysis, can be communicated to a process or system, such as a geo-steering system or a well site controller. In a step 745, the communicated information can be utilized to update directions for a geo-steering system or can be utilized to update a borehole operation plan. Method 701 ends at a step 795.

Figure 7B:
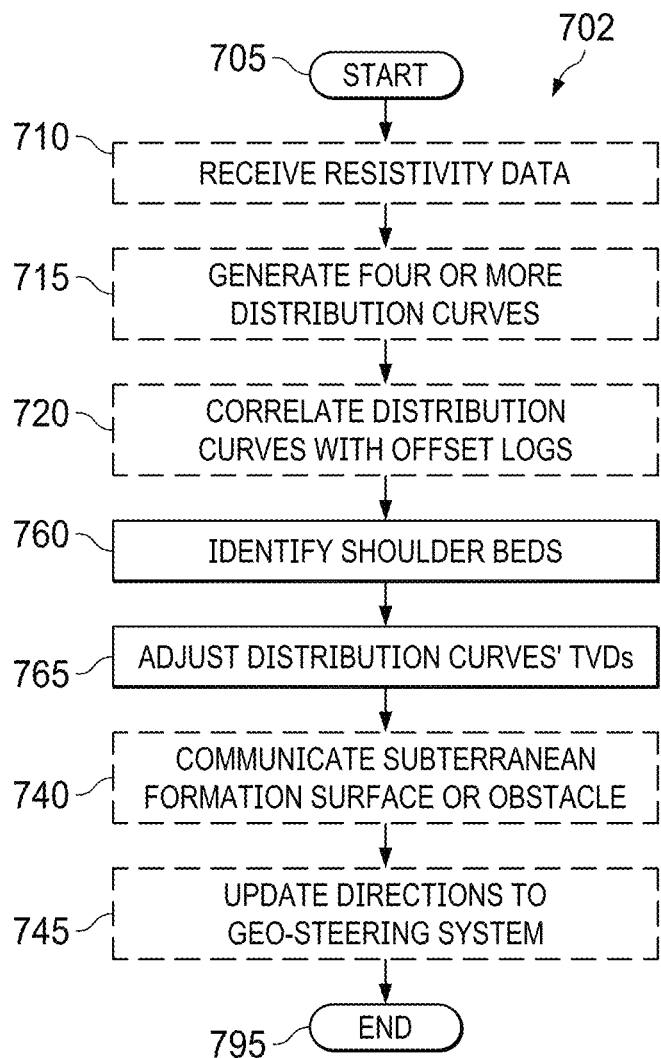
FIG. 7B is an illustration of a flow diagram of an example method, building on FIG. 7A, to correlate TVDs to a measured depth.

FIG. 7B is an illustration of a flow diagram of an example method 702, building on FIG. 7A, to correlate TVDs to an MD. Method 702 can be performed on a computing system, for example, localization analyzer system 800 of FIG. 8 or localization analyzer controller 900 of FIG. 9. The computing system can be a well site controller, a geo-steering system, a resistivity system, a reservoir controller, a data center, a cloud environment, a server, a laptop, a mobile device, smartphone, PDA, or other computing system capable of receiving the resistivity data, input parameters, and capable of communicating with other computing systems. Method 702 can be encapsulated in software code or in hardware, for example, an application, code library, dynamic link library, module, function, RAM, ROM, and other software and hardware implementations. The software can be stored in a file, database, or other computing system storage mechanism. Method 702 can be partially implemented in software and partially in hardware. Method 702 can perform the steps for the described processes, for example, calculating distribution curves, overlaying offset logs, or identifying subterranean formation surfaces.

Method 702 builds on method 701 where similar steps are shown using dashed boxes. The method steps previously described utilize the same process steps except as noted herein. Proceeding from previously described step 720, method 702 proceeds to a step 760. In step 760, shoulder beds can be identified using the distribution curves. The distribution curves can be correlated with offset resistivity logs, e.g., correlated distribution curves. The distribution curves, as they approximately change orientation at an approximately similar TVD, can reveal a location of a shoulder bed. As the number of distribution curves increases, the confidence in this identification can also increase.

In a step 765, adjustments can be made to the TVD for each distribution curve to better align each distribution curve. In some aspects, a user can select a point along two or more distribution curves and select an alignment algorithm to utilize to align the TVD values for those selected distribution curves. The alignment algorithm can be one or various statistical algorithms, for example, an average, a mean, a median, a minimum, a maximum, a weighted valuation, or other algorithms. In some aspects, a type of linear fit algorithm can be utilized to fit the selected distribution curves. After the selected distribution curves have been adjusted for their respective TVDs, the shoulder beds and other subterranean formation characteristics can be better identified, e.g., adjusted shoulder beds, and used as inputs into other processes or systems. Proceeding to step 740, step 740 inputs include the analysis and outputs from step 765, and can be communicated as the subterranean formation surface information, other results, and analysis. Method 702 proceeds through the previously described steps of method 701.

Figure 7C:
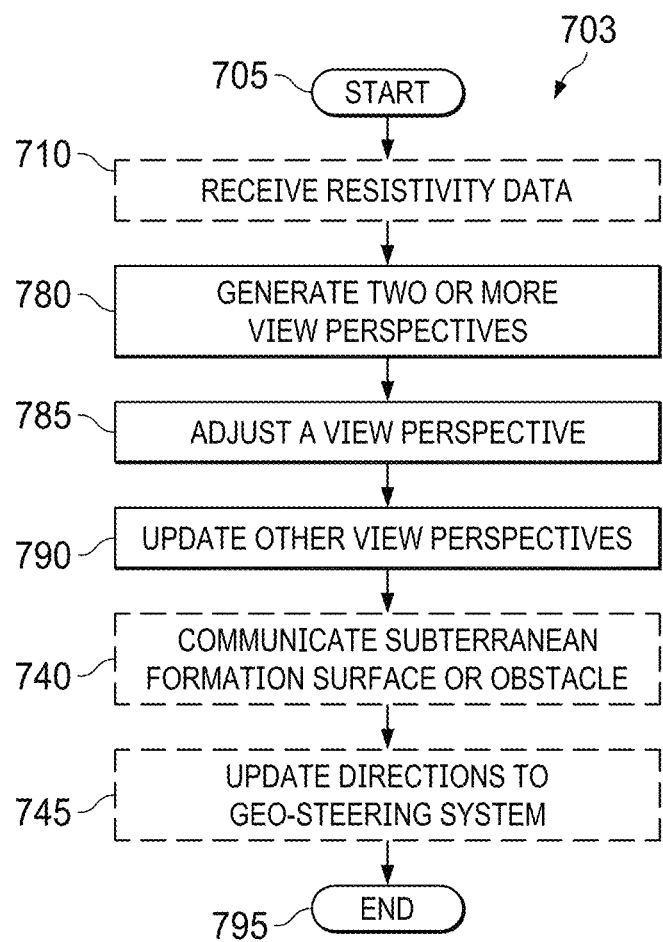
FIG. 7C is an illustration of a flow diagram of an example method, building on FIG. 7A, to utilize multiple perspectives of a downhole location.

FIG. 7C is an illustration of a flow diagram of an example method 703 to utilize multiple perspectives of a downhole location. Method 703 can be performed on a computing system, for example, localization analyzer system 800 of FIG. 8 or localization analyzer controller 900 of FIG. 9. The computing system can be a well site controller, a geosteering system, a resistivity system, a reservoir controller, a data center, a cloud environment, a server, a laptop, a mobile device, smartphone, PDA, or other computing system capable of receiving the resistivity data, input parameters, and capable of communicating with other computing systems. Method 703 can be encapsulated in software code or in hardware, for example, an application, code library, dynamic link library, module, function, RAM, ROM, and other software and hardware implementations. The software can be stored in a file, database, or other computing system storage mechanism. Method 703 can be partially implemented in software and partially in hardware. Method 703 can perform the steps for the described processes, for example, calculating distribution curves, overlaying offset logs, or identifying subterranean formation surfaces.

Method 703 builds on method 701 where similar steps are shown using dashed boxes. The method steps previously described utilize the same process steps except as noted herein. Proceeding from previously described step 710, method 703 proceeds to a step 780. In step 780, two or more view perspectives can be generated of a specified location of a borehole and surrounding subterranean formation area. The specified location can be identified by a system or a user and be a focus area for each of the respective view perspectives to be generated from. Typically, four or five view perspectives can be used in conjunction to visualize the area of interest downhole. In some aspects, the number of view perspectives can be various numbers of view perspectives, such as three, four, five, six, or other number of view perspectives.

In a step 785, one of the view perspectives can be adjusted, e.g., a current view. The adjustment can be of various combinations of moves, slides, rotations, tilts, and other movements in one or more of the x, y, or z axial directions. In some aspects, a zoom in or zoom out adjustment can be applied using the focal point as the focus area of interest. In a step 790, the other view perspectives, e.g., non-current view perspectives, can be similarly adjusted using the same adjustment as the current view perspective, applied to the view perspective's orientation. The other view perspectives can be adjusted in real-time, near real-time, or be triggered by another event, for example, a user selecting an 'apply' function. By synchronizing the two or more view perspectives, an improved analysis can be conducted and an improved identification of subterranean formation surfaces, beds, obstacles, proximate boreholes, and other borehole characteristics and geological characteristics can be made.

Proceeding to step 740, step 740 inputs include the analysis and outputs from step 790, for example, an identified location of an anomaly, obstacle, or geological feature, and can be communicated as the subterranean formation surface information, other results, and analysis. Method 703 proceeds through the previously described steps of method 701.

In some aspects, method 701, method 702, and method 703 can be performed by a computing system without a visual component or user interaction. The method steps can be performed by a computing system, such as a machine learning system, and communicated to other processes or systems. In some aspects, method 701, method 702, and method 703 can be performed by a computing system with a user providing input, such as using a visual display to identify a subterranean formation surface, a shoulder bed, or to adjust a view perspective.

Figure 8:
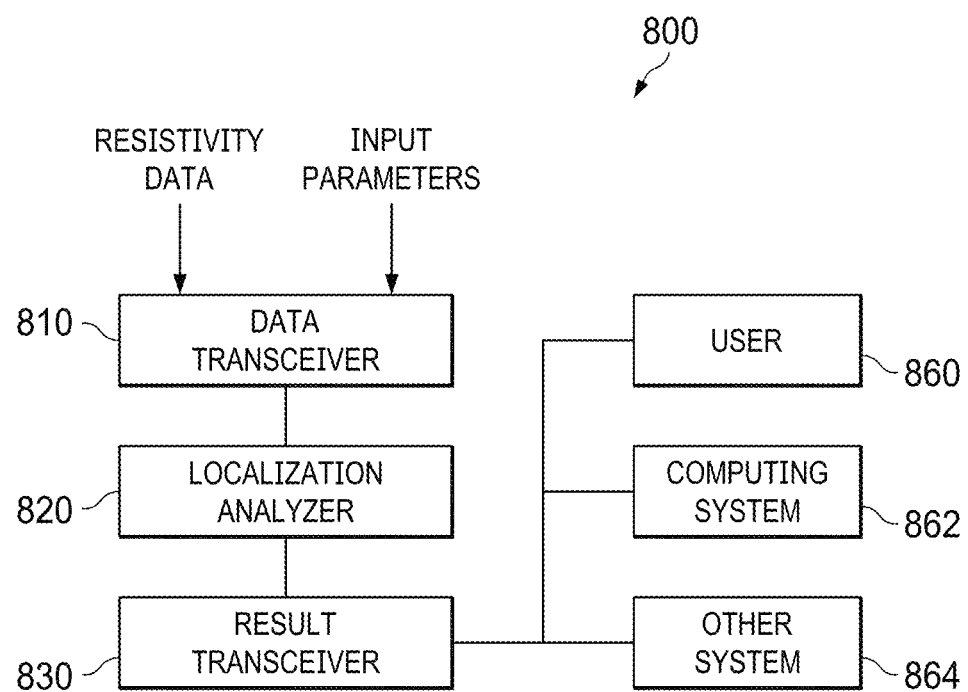
FIG. 8 is an illustration of a block diagram of an example downhole localization analyzer system.

FIG. 8 is an illustration of a block diagram of an example localization analyzer system 800, which can be implemented in one or more computing systems, for example, a data center, cloud environment, server, laptop, smartphone, tablet, and other computing systems. In some aspects, localization analyzer system 800 can be implemented using a localization analyzer controller such as localization analyzer controller 900 of FIG. 9. Localization analyzer system 800 can implement one or more methods of this disclosure, such as method 701 of FIG. 7A, method 702 of FIG. 7B, and method 703 of FIG. 7C.

Localization analyzer system 800, or a portion thereof, can be implemented as an application, a code library, a dynamic link library, a function, a module, other software implementation, or combinations thereof. In some aspects, localization analyzer system 800 can be implemented in hardware, such as a ROM, a graphics processing unit, or other hardware implementation. In some aspects, localization analyzer system 800 can be implemented partially as a software application and partially as a hardware implementation. Localization analyzer system 800 is a functional view of the disclosed processes and an implementation can combine or separate the described functions in one or more software or hardware systems.

Localization analyzer system 800 includes a data transceiver 810, a localization analyzer 820, and a result transceiver 830. The results, e.g., the subterranean formation surfaces information, geological bed information, obstacle locations, proximate borehole locations, other geological characteristics or borehole characteristics, location information, analysis, and interim outputs from localization analyzer 820 can be communicated to a data receiver, such as one or more of a user or user system 860, a computing system 862, or other processing or storage systems 864. The results can be used to determine the directions provided to a geosteering system or used as inputs into a well site controller or other borehole system, such as a borehole operation planning system.

Data transceiver 810 can receive input parameters, such as parameters to direct the operation of the analysis implemented by localization analyzer 820, such as algorithms to utilize in determining distribution curves or in determining the adjustments to the respective TVDs of selected distribution curves. In some aspects, input parameters can include user inputs, such as a selection of distribution curves to adjust, identification of surfaces or beds, or adjustment directions to a view perspective. In some aspects, data transceiver 810 can be part of localization analyzer 820.

Result transceiver 830 can communicate one or more results, analysis, or interim outputs, to one or more data receivers, such as user or user system 860, computing system 862, storage system 864, e.g., a data store or database, or other related systems, whether located proximate result transceiver 830 or distant from result transceiver 830. Data transceiver 810, localization analyzer 820, and result transceiver 830 can be, or can include, conventional interfaces configured for transmitting and receiving data. In some aspects, localization analyzer 820 can be a machine learning system, such as providing a process to analyze resistivity data by using computational methods to compare distribution curves to offset logs to derive analysis results, such as subterranean formation surface information, beds, obstacles, proximate boreholes, and other borehole or geological characteristics.

Localization analyzer 820 can implement the analysis and algorithms as described herein utilizing the resistivity data, the input parameters, and the offset logs. For example, localization analyzer 820 can perform the analysis of distribution curves to identify subterranean surfaces, to adjust TVDs of selected distribution curves, and to synchronize multiple view perspectives using one selected focus area.

A memory or data storage of localization analyzer 820 can be configured to store the processes and algorithms for directing the operation of localization analyzer 820. Localization analyzer 820 can also include a processor that is configured to operate according to the analysis operations and algorithms disclosed herein, and an interface to communicate (transmit and receive) data.

Figure 9:
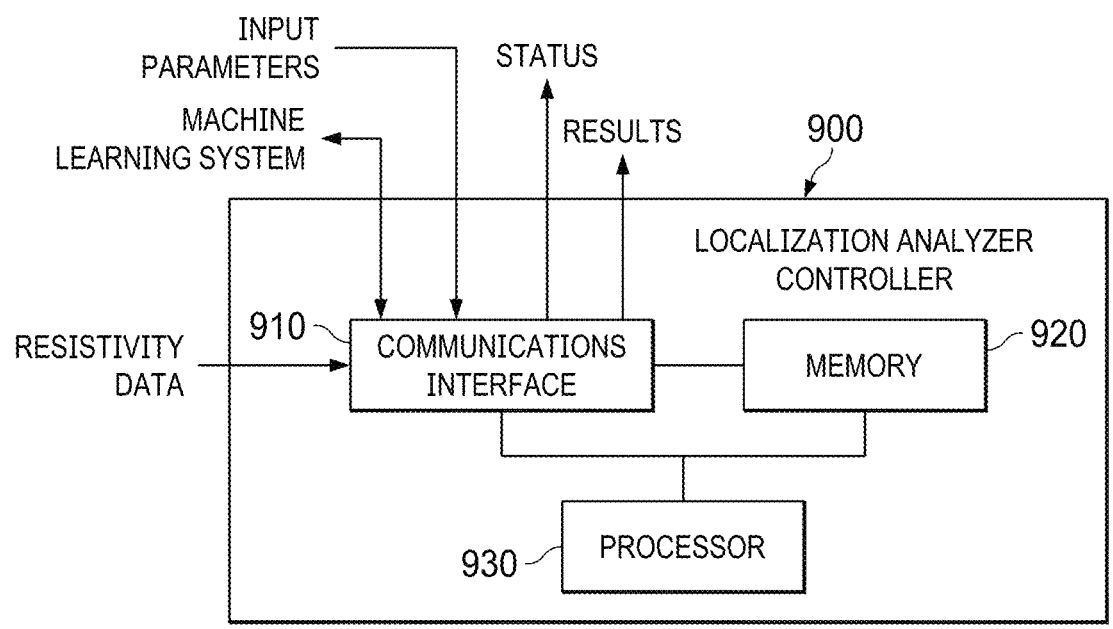
FIG. 9 is an illustration of a block diagram of an example of downhole localization analyzer controller according to the principles of the disclosure.

FIG. 9 is an illustration of a block diagram of an example of localization analyzer controller 900 according to the principles of the disclosure. Localization analyzer controller 900 can be stored on a single computer or on multiple computers. The various components of localization analyzer controller 900 can communicate via wireless or wired conventional connections. A portion or a whole of localization analyzer controller 900 can be located at one or more locations and other portions of localization analyzer controller 900 can be located on a computing device or devices located at a surface location. In some aspects, localization analyzer controller 900 can be wholly located at a surface or distant location. In some aspects, localization analyzer controller 900 can be part of another system, and can be integrated in a single device, such as a part of a borehole operation planning system, a well site controller, a geo-steering system, or other borehole system.

Localization analyzer controller 900 can be configured to perform the various functions disclosed herein including receiving input parameters and resistivity data, and generating results from an execution of the methods and processes described herein, such as identifying subterranean formation surfaces, shoulder beds, distribution curves, localizing obstacles, proximate boreholes, or other geological formations, and other results and analysis. Localization analyzer controller 900 includes a communications interface 910, a memory 920, and a processor 930.

Communications interface 910 is configured to transmit and receive data. For example, communications interface 910 can receive the input parameters, and resistivity data. Communications interface 910 can transmit the generated results, data from the input files, or interim outputs. In some aspects, communications interface 910 can transmit a status, such as a success or failure indicator of localization analyzer controller 900 regarding receiving the various inputs, transmitting the generated results, or producing the generated results.

In some aspects, communications interface 910 can receive input parameters from a machine learning system, for example, where the resistivity data is processed using one or more filters and algorithms prior to determining the distribution curves or displaying a view perspective.

In some aspects, the machine learning system can be implemented by processor 930 and perform the operations as described by localization analyzer 820. Communications interface 910 can communicate via communication systems used in the industry. For example, wireless or wired protocols can be used. Communication interface 910 is capable of performing the operations as described for data transceiver 810 and result transceiver 830 of FIG. 8.

Memory 920 can be configured to store a series of operating instructions that direct the operation of processor 930 when initiated, including the code representing the algorithms for determining processing the collected data. Memory 920 is a non-transitory computer readable medium. Multiple types of memory can be used for data storage and memory 920 can be distributed.

Processor 930 can be configured to produce the generated results (e.g., identification of subterranean formation surfaces, identification of shoulder beds, localization of obstacles, proximate boreholes, or geological anomalies, synchronized view perspectives, and other results), one or more interim outputs, and statuses utilizing the received inputs. For example, processor 930 can analyze distribution curves for a slice of resistivity data to identify subterranean formation surfaces or layers. Processor 930 can be configured to direct the operation of localization analyzer controller 900. Processor 930 includes the logic to communicate with communications interface 910 and memory 920, and perform the functions described herein. Processor 930 is capable of performing or directing the operations as described by localization analyzer 820 of FIG. 8.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY can have one or more of the following additional elements in combination. Element 1: further comprising communicating, using a result transceiver, the one or more adjusted shoulder beds to a borehole operation planning system or a geo-steering system. Element 2: further comprising updating, utilizing the one or more adjusted shoulder beds, directions for the geo-steering system or operation plans for the borehole operation planning system. Element 3: wherein the adjusting utilizes an alignment algorithm specified in the input parameters to align the TVDs of each of the one or more distribution curves. Element 4: wherein the alignment algorithm is one of an average, a mean, a median, a minimum, a maximum, or a weighted valuation. Element 5: wherein the adjusting further includes using user input to select two or more distribution curves from the set of distribution curves to align their respective TVDs. Element 6: wherein the method is performed by a localization analyzer. Element 7: wherein the localization analyzer is a machine learning system. Element 8: wherein the localization analyzer is located with a geo-steering system. Element 9: wherein the resistivity data is received from one or more ultra-deep resistivity tools located downhole the borehole. Element 10: further comprising a machine learning system, capable of communicating with the data transceiver and the localization analyzer, and performing a filtering of the distribution curves. Element 11: wherein the localization analyzer is a machine learning system. Element 12: further comprising a result transceiver, capable of communicating results, interim outputs, and adjusted shoulder beds to a user system, a data store, or a computing system. Element 13: further comprising a borehole system, capable of receiving the results, the interim outputs, and the adjusted shoulder beds, wherein the borehole system is one of a geo-steering system or a borehole operation planning system. Element 14: wherein the localization analyzer is located proximate the borehole system. Element 15: further comprising an ultra-deep resistivity tool, capable of communicating collected resistivity data to the data transceiver, wherein the ultra-deep resistivity tool is located downhole the borehole. Element 16: wherein the adjusting utilizes an alignment algorithm specified in the input parameters to align the TVDs of each of the one or more distribution curves. Element 17: wherein the operations are performed by a machine learning system.

What is claimed is:

1. A method, comprising:
    receiving input parameters and resistivity data for a borehole;
    generating a set of distribution curves utilizing the resistivity data and the input parameters;
    correlating one or more offset resistivity logs with the set of distribution curves;
    identifying one or more shoulder beds through an analysis of the correlating;
    adjusting the one or more resistivity logs to align with true vertical depths (TVDs) of the set of distribution curves, and identify one or more adjusted shoulder beds, and
    steering, using a geo-steering system, a drill bit to a target area, wherein the one or more adjusted shoulder beds are used as one or more control points for the geo-steering system.

2. The method as recited in claim 1, further comprising:
    communicating, using a result transceiver, the one or more adjusted shoulder beds to the geo-steering system.

3. The method as recited in claim 2, further comprising:
    updating, utilizing the one or more adjusted shoulder beds, directions for the geo-steering system.

4. The method as recited in claim 1, wherein the adjusting utilizes an alignment algorithm specified in the input parameters to align the TVDs of each of the set of distribution curves.

5. The method as recited in claim 4, wherein the alignment algorithm is one of an average, a mean, a median, a minimum, a maximum, or a weighted valuation.

6. The method as recited in claim 1, wherein the adjusting further includes using user input to select two or more distribution curves from the set of distribution curves to align respective TVDs.

7. The method as recited in claim 1, wherein one or more steps of the method is performed by a machine learning system.

8. The method as recited in claim 7, wherein the machine learning system is located with the geo-steering system.

9. The method as recited in claim 1, wherein the resistivity data is received from one or more ultra-deep resistivity tools located in the borehole.

10. A system, comprising:
    a data transceiver, capable of receiving input parameters and resistivity data for a location downhole a borehole;
    a localization analyzer, capable of communicating with the data transceiver, generating distribution curves utilizing the resistivity data, overlaying the distribution curves with offset logs, aligning true vertical depths (TVDs) of selected distribution curves, and identifying at least one subterranean formation surface by adjusting the offset logs using the TVDs, wherein there are more than four distribution curves, and
    a geo-steering system capable of steering a drill bit to a target area, wherein the geo-steering system uses the at least one subterranean formation surface as at least one control point for the geo-steering system.

11. The system as recited in claim 10, further comprising:
    a machine learning system, capable of communicating with the data transceiver and the localization analyzer, and performing a filtering of the distribution curves.

12. The system as recited in claim 10, wherein the localization analyzer is a machine learning system.

13. The system as recited in claim 10, further comprising:
    a result transceiver, capable of communicating results, interim outputs, and the at least one subterranean formation surface to a user system, a data store, or a computing system.

14. The system as recited in claim 10, wherein the at least one subterranean formation surface is a shoulder bed.

15. The system as recited in claim 10, wherein the localization analyzer is located with the geo-steering system.

16. The system as recited in claim 10, further comprising:
    an ultra-deep resistivity tool, capable of communicating the resistivity data to the data transceiver, wherein the ultra-deep resistivity tool is located in the borehole.

17. A non-transitory computer readable medium having a series of operating instructions stored thereon that directs a data processing apparatus when executed thereby to perform operations to analyze distribution curves of resistivity data collected downhole a borehole and direct a geo-steering system, the operations comprising:
    receiving the resistivity data for the borehole;
    generating a set of distribution curves utilizing the resistivity data;
    correlating one or more offset resistivity logs with the set of distribution curves;
    identifying one or more shoulder beds through an analysis of the correlating;
    adjusting the one or more offset resistivity logs using true vertical depths (TVDs) of the set of distribution curves, and identifying one or more adjusted shoulder beds from the one or more offset resistivity logs; and
    directing, via the geo-steering system, a drill bit to a target area, wherein the one or more adjusted shoulder beds is used as one or more control points for the geo-steering system.

18. The non-transitory computer readable medium as recited in claim 17, further comprising:
    communicating, using a result transceiver, the one or more adjusted shoulder beds to the geo-steering system.

19. The non-transitory computer readable medium as recited in claim 18, further comprising:
    updating, utilizing the one or more adjusted shoulder beds, directions for the geo-steering system.

20. The non-transitory computer readable medium as recited in claim 17, wherein the adjusting utilizes an alignment algorithm to align the TVDs of each of the set of distribution curves.

21. The non-transitory computer readable medium as recited in claim 17, wherein the adjusting further includes using user input to select two or more distribution curves from the set of distribution curves to align respective TVDs.

22. The non-transitory computer readable medium as recited in claim 17, wherein the operations are performed by a machine learning system.

* * * * *